June 7, 1932.   E. EMISCH   1,862,213
COWL
Filed May 5, 1930
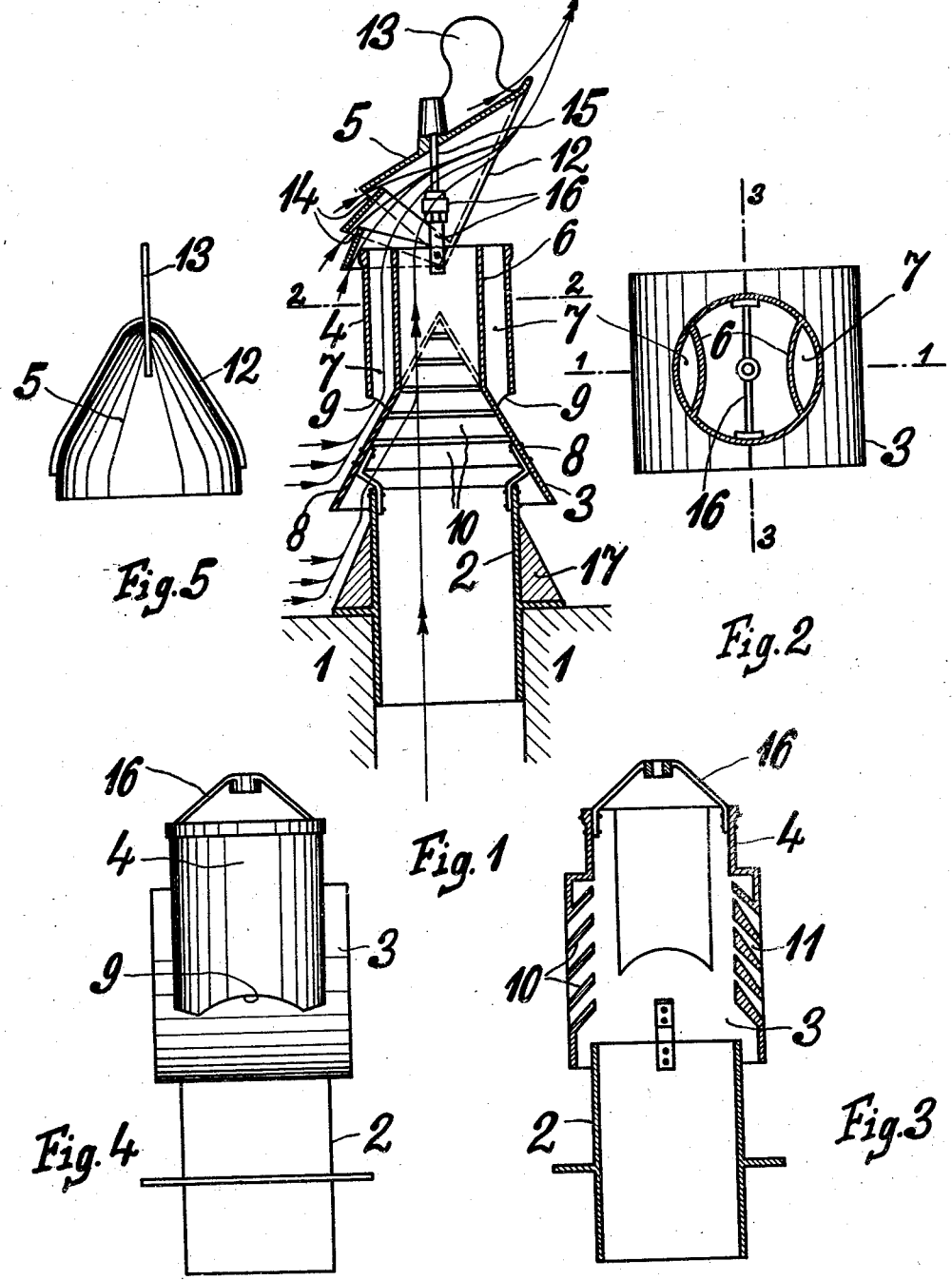

Patented June 7, 1932

1,862,213

UNITED STATES PATENT OFFICE

EMIL EMISCH, OF MAGDEBURG, GERMANY

COWL

Application filed May 5, 1930, Serial No. 449,986, and in Germany June 26, 1929.

Chimneys have sometimes such an unfavorable position that even with cowls there is no proper draught when a certain direction of wind is prevalent.

It has been proposed to obviate this inconvenience by enclosing the mouth of the smoke discharge pipe, circular in the upper portion, with an envelope which forms an annular space between itself and the smoke discharge pipe. The object is, to make the wind blow into this annular space, to suck the smoke out of the chimney and to conduct the same into the atmosphere. Owing to the cylindrical shape of the smoke discharge pipe almost the totality of the wind blowing against the same does not flow, into the annular space but divides and passes around the envelope. The small portion of the wind which enters the annular space remains ineffective, as it is lost in the annular space of comparatively large cross section and consequently reducing the velocity of the wind, so that this portion of the wind can possess only little suction power which is further reduced by eddies formed when the stream lines of the wind join, which enters the annular space and moves around the end of the smoke discharge pipe.

It has further been proposed to join to the end of a substantially cylindrical smoke discharge pipe several wind channels open at the lower end, into which however no wind can enter as the wind blowing against the smoke discharge pipe will flow around the same to either side. These wind channels are therefore quite useless.

These inconveniences are obviated by the cowl according to the invention. In this cowl the smoke discharge pipe merges into a cap similar to a gabled roof directly exposed to the wind, on which a tube ending in the cap is mounted. This tube is roofed by a rotatable wind hood with a vane. From the tube wind channels are partitioned off adjacent the two inclined surfaces of the cap and of a cross section which is small in comparison with the cross section of the tube. These wind channels open at the lower end towards the inclined surfaces of the cap so that they communicate with the outer air but not with the inner space of the cap.

The cowl is adjusted so that an inclined surface of the cap is standing opposite the unfavorable wind direction. The wind therefore blows against this inclined face, is deflected in upward direction and flows partly into the wind channel adjacent to this inclined face. As the cross section of the channel is small, the wind preserves its velocity and exerts consequently a great suction force, which can be further increased if the wind channel is tapered in upward direction and if the inlet opening of the channel is fitted with a wide paper-bag like extension capable to catch the greatest possible quantity of wind. The smoke is drawn out of the chimney in that the rotatable wind hood conducts over the smoke discharge tube the wind whistling through the channel, so that the injector effect takes place. An increase, also comparatively little, of the suction effect is possible, if the edge of the wind hood upwardly inclined with regard to the chimney axis is folded over perpendicularly with regard to the vane.

When the wind blows from the opposite direction, the other wind channel enters into operation, and when it blows from any of the two other directions, the well known Venetian blinds in the two gable walls cause a suction effect. These Venetian blinds can be made nozzle shaped to improve their effect, in order that the velocity of the wind be increased.

The cowl according to the invention increases the draft in the chimney not only when the wind is blowing from the unfavorable direction, but at all wind directions. The construction of the cowl is as simple as possible and very practical.

An embodiment of the invention is illustrated by way of example in the accompanying drawing in which:

Fig. 1 is a longitudinal section through the cowl on line 1—1 of Fig. 2.

Fig. 2 is a cross section on line 2—2 of Fig. 1.

Fig. 3 is a longitudinal section on line 3—3 of Fig. 2, the wind hood being removed.

Fig. 4 shows an elevation corresponding to the longitudinal section in Fig. 3.

Fig. 5 is a rear elevation of the wind hood.

A tube 2 of square cross section is placed on the chimney 1 and carries a cap 3 like a gable-roof open at the lower end. This cap 3 merges into a tube 4 which carries a rotatable wind hood 5. Wind channels 7, communicating at the lower end with the atmospheric air, are separated by vertical partitions 6 from the tube 4 which communicates with the interior of the cap 3, the cross section of said channels being small compared with the remaining cross section of the tube. These channels end close over the two inclined surfaces 8 of the cap 3 which shut off the channels from the inner space of the cap. Each channel 7 has at the lower end an entrance opening 9 for the air.

The two gable sides of cap 3 consist of Venetian blinds 10 which, as shown on the right side in Fig. 3, may form gaps 11 narrowing nozzle like, to increase the velocity of the onblowing wind. The nozzle shape of the gaps might be obtained by increasing the angle of inclination of the Venetian blinds 10 from above downward. The Venetian blinds might be made longer.

The edge 12 of the wind hood is bent at right angles, as best shown in Fig. 5, so that it offers to the wind a surface for action. The hood 5 carrying a vane 13 is composed of three parts. The several parts form, in known manner, nozzle like air inlet slots 14. The hood rotates around a bolt 15 mounted in a bridge 16.

In Fig. 1 the courses of flow of the wind and of the smoke are indicated by lines with arrow heads. The wind lines are indicated by a single arrow head and the smoke lines by double arrow heads. The suction force of the wind blowing against the inclined face 8 and through the channel 7 is further increased by the wind entering into the wind hood and by the wind getting under the cap 3. The tube 2, in order to impart to the wind an upwardly directed component, is enclosed for example by a concrete envelope 17. A further increasing of the suction force is effected by the outwardly bent upper edge 15 of the wind hood, which imparts to the wind a sudden change of direction thereby forming a vacuum.

When the wind blows against the gable sides of the cap, it flows, instead through one of the channels 7, through the gaps formed by the Venetian blinds 10.

Under certain conditions it is advisable, to arrange above the wind channels deflectors designed to conduct the air from the channels over the smoke discharge pipe.

If the cap 3 is closed at the lower end, the concrete envelope 17 is not necessary. In order to obtain even then an increase of the suction effect, it is advisable to fit all the sides of the square tube with Venetian blinds.

I claim:—

A cowl, comprising in combination with the smoke discharge pipe, a gable-roof-shaped cap on the upper end of said pipe, end walls on said cap having gaps communicating directly with the atmosphere adapted to guide the wind into the interior of said cap, a cylindrical tube on and forming an extension of said cap; lateral wind channels of comparatively small cross-section extending the entire length of and partitioned off from the interior of said cylindrical tube, and a rotatable hood on and covering the upper end of said tube composed of a plurality of overlapping parts inclined relative to the chimney axis and arranged with intervening gaps adapted to allow the passage of air, the upper edge of the upper part of said hood being bent upwards, and a vane on the upper side of the upper part of said hood for steering said hood.

In testimony whereof I affix my signature.

EMIL EMISCH.